Patented July 17, 1951

2,560,616

UNITED STATES PATENT OFFICE 2,560,616

METHOD OF PREPARING PTERIDINES

David I. Weisblat and Arthur R. Hanze, Kalamazoo, Mich., assignors to The Upjohn Company, Kalamazoo, Mich., a corporation of Michigan No Drawing. Application July 31, 1948, Serial No. 41,885

9 Claims. (Cl. 260—251.5)

This invention relates to a method for preparing N-((2-amino-4-hydroxy-6-pteridyl)methyl)-p-aminobenzoate compounds, particularly to a method for preparing such compounds related closely to the group of substances commonly referred to as "folic acids," and to intermediates useful in the method.

Compounds which can be prepared by the method of the invention are the N-((2-amino-4-hydroxy-6-pteridyl)methyl) - p - aminobenzoate compounds having the general formula

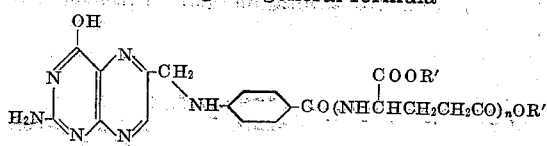

wherein R' is from the group consisting of hydrogen and the alkyl radicals, and $n$ is from the group consisting of zero and the positive integers 1 to 7, inclusive.

In the naming of compounds of the invention when both a glutamic acid residue and a p-aminobenzoic acid residue are included in the molecule, the nitrogen atom of the glutamic acid residue is, for convenience, herein referred to by the symbol "N'" and the nitrogen atom of the p-aminobenzoic acid residue is referred to by the symbol "N." As indicated by the formula given, compounds containing more than one glutamic acid or ester residue contemplated by the invention are those wherein only the gamma-carboxyl groups are involved in the peptide linkages.

Certain of the N-((2-amino-4-hydroxy-6-pteridyl)methyl) - p - aminobenzoate compounds prepared by the method of the invention appear to be identical with certain compounds of the group isolated from natural sources and referred to broadly in the art as "folic acids." Thus N'-(N-((2 - amino-4-hydroxy-6-pteridyl)methyl)-p-aminobenzoyl)-glutamic acid (pteroyl-glutamic acid) wherein the glutamic acid residue has the same configuration as l(+)-glutamic acid appears to be identical with the so-called "L. casei factor" or vitamin Bc isolated from liver. Other compounds of the same general nature, but having two or more glutamic acid residues connected through the gamma-carboxyl groups which can be prepared by the method given, appear to be identical with and to have the same biological activity of still other members of the folic acid group. The value of methods for preparing these and related compounds synthetically is apparent.

The reactions involved in the method of the invention are indicated in the accompanying diagram.

According to the method of the invention, the N-((2-amino-4-hydroxy - 6 - pteridyl)methyl)-p-aminobenzoate Compounds IV are prepared by heating a mixture comprising 2,4,5-triamino-6-hydroxypyrimidine (I), a p-aminobenzoate compound having the Formula III, a haloketone having the Formula II and an inert diluent. The mixture is heated, usually at from about 40° C. or lower to about 100° C. for several minutes to several hours and then worked up in any convenient manner to recover the N-((2-amino-4-hydroxy - 6 - pteridyl)methyl) - p - aminobenzoate compound. One convenient method for recovering the product consists in diluting the mixture with a relatively large volume of water or aqueous alcohol and filtering after adjusting the pH of the diluted mixture to about 3. The N-((2-amino-4-hydroxy - 6 - pteridyl)methyl)-p-aminobenzoate compound is thus obtained in solid form and can be purified further, if desired, by repeated washing with cold alcohol.

The reaction is carried out conveniently either by mixing all of the reactants together and heating the mixture or, with advantage in certain instances, by adding the haloketone to one of the other reactants and subsequently adding the third reactant to the mixture with or without intermediate heating before adding the third reactant.

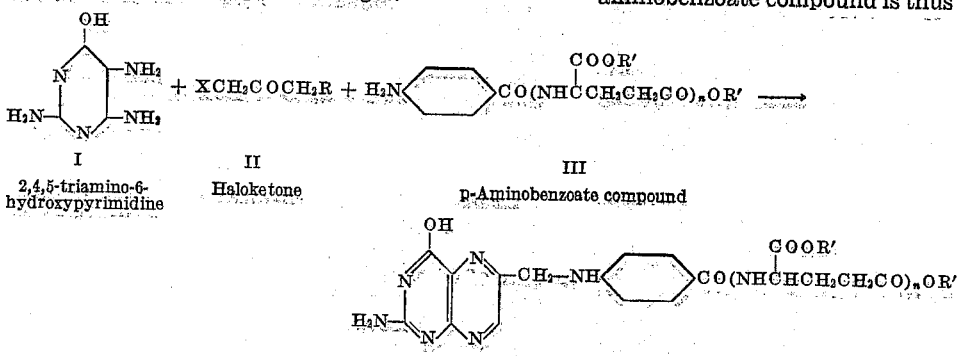

I
2,4,5-triamino-6-hydroxypyrimidine

II
Haloketone

III
p-Aminobenzoate compound

IV
N-((2-amino-4-hydroxy-6-pteridyl)methyl)-p-aminobenzoate compound

Inert diluents which can be used include aqueous acetic acid, propionic acid, ethylene glycol, propylene glycol, the polyglycols and their esters as well as many others.

It has been noted that advantages results in the way of increased yield and a faster reaction rate are generally obtained, particularly when using a chloro- or bromo-ketone, by including a small proportion of an alkali metal iodide, e. g. of sodium or potassium iodide, in the mixture. It is also frequently advantageous, particularly when an aqueous acetic acid medium is used, to include sodium acetate or other alkaline salt in the mixture to increase the pH somewhat and buffer the mixture. The reaction is preferably, but not necessarily, carried out under anhydrous conditions. Although the mechanism of the reaction is not completely understood, it is found that when the reaction is carried out as described, substantially complete aromatization of the heterocyclic ring occurs with the formation of the pteridine nucleus. N-((2-amino-4-hydroxy-6-pteridyl)methyl)-p-aminobenzoate compounds which are esters can be hydrolyzed readily to the corresponding acids with dilute alkalies.

The haloketones which can be used in the reaction are the dihaloacetones and the mono-halo-mono-hydroxy acetones having the general formula $$XCH_2COCH_2R$$

wherein X is a halogen from the group consisting of chlorine, bromine and iodine and R is from the group consisting of chlorine, bromine, iodine and the hydroxyl radical.

p-Amino-benzoate compounds having the Formula III which can be used in the process include those wherein $n$ is zero, i. e. p-aminobenzoic acid, and alkyl esters thereof, and also those wherein $n$ is an integer from 1 to 7, inclusive, such as N'-(p-aminobenzoyl)-glutamic acid, N'-(p-aminobenzoyl)-gamma-glutamylglutamic acid, N'-(p-aminobenzoyl)-gamma-glutamyl-gamma-glutamylglutamic acid and their alkyl esters.

The p-aminobenzoate compounds wherein $n$ is an integer from the group 1 to 7, inclusive, can be obtained in a number of ways, one of which is described in a concurrently filed copending application Serial No. 41,888. According to the method of the copending application, a p-aminobenzoate compound having one glutamic acid residue in the molecule is prepared by first reacting glutamic acid or an alkyl ester thereof with a p-nitrobenzoyl halide. The halides referred to in this connection are the chlorides and the bromides. An N'-(p-nitrobenzoyl)-glutamic acid or ester is first obtained which, upon reduction, e. g. with hydrogen using platinum oxide as a catalyst, yields an N'-(p-aminobenzoyl)-glutamic acid or ester. The N'(p-aminobenzoyl)-glutamic acid can, if desired, be converted to the corresponding alkyl esters, e. g. by treatment with an alkanol and an esterification catalyst in known matter, or the esters can be hydrolyzed to the corresponding acids. In similar manner, other p-aminobenzoate compounds can be prepared having up to seven glutamic acid residues in the molecule by starting with the corresponding gamma-glutamylglutamic acid or ester containing the requisite number of peptide linkages.

Although the invention will be described, in the case of esters, with particular reference to the ethyl esters, it is understood that other alkyl esters, such as the methyl, propyl, iso-propyl, butyl, tert-butyl, hexyl, nonyl and dodecyl esters, can be used with equal facility, if desired.

Although the invention is directed particularly, in case of esters of the glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

A preferred modification of the invention comprises the use in the reaction of dichloroacetone and of a p-aminobenzoate compound having one glutamic acid or ester residue in the molecule, i. e. of N'-(p-aminobenzoyl)-glutamic acid or its ester, to form N'-(N-((2-amino-4-hydroxy-6-pteridyl)methyl) - p - aminobenzoyl) - glutamic acid or its ester, although the invention is not so limited.

Compounds similar to or identical with those of the folic acid group made by using the intermediates or method of the invention, such as pteroylglutamic acid and pteroyl-gamma-glutamyl-gamma-glutamylglutamic acid, which are of greatest value as measured by their biological activity against *Lactobacillus casei* or *Streptococcus fecalis* R, are those having the same configuration as l(+)-glutamic acid. However, the invention also contemplates compounds having the dextro configuration as well as racemic mixtures.

Certain advantages of the invention are apparent from the following examples which are given by way of illustration only and are not to be construed as limiting.

*Example 1. — Diethyl N' - (p - nitrobenzoyl) - l-glutamate*

One hundred eleven grams of p-nitrobenzoyl chloride was added at about 0° C. over a period of about one hour to a solution of 95.8 grams of crude diethyl l(+)-glutamate hydrochloride and 80 milliliters of pyridine in 200 milliliters of benzene. The mixture was stirred for five hours, extracted first with dilute hydrochloric acid and then with aqueous sodium bicarbonate and the benzene removed under reduced pressure. The residue consisted of 110 grams of a pasty, neutral fraction consisting largely of diethyl N'-(p-nitrobenzoyl)-l-glutamate. After recrystallization from dilute ethanol, the ester melted at 93° to 95° C. It had a specific rotation of $(\alpha)_D^{25} = -18°$. The sodium bicarbonate extract upon acidification yielded 42 grams of p-nitrobenzoic acid.

*Example 2. — Diethyl N' - (p - aminobenzoyl) - l-glutamate*

Crude diethyl N'-(p-nitrobenzoyl)-l-glutamate prepared as in Example 1 was dissolved in ethanol and reduced with hydrogen under a pressure of 40 pounds per square inch using platinum oxide as a catalyst. The mixture was then filtered to recover platinum and the ethanol evaporated under reduced pressure. There was thus obtained a 52 per cent yield of diethyl N'-(p-aminobenzoyl)-l-glutamate melting at 135° to 138° C. Upon recrystallization from dilute ethanol, the ester melted at 140° to 141° C. and had a specific rotation $(\alpha)_D^{25} = -9.5°$ in 95 per cent ethanol.

Anal. Calcd. for $C_{16}H_{22}O_5N_2$: C, 59.6; H, 6.9; N, 8.7. Found: C, 59.6; H, 6.8; N, 9.0.

*Example 3.—N'-(p-nitrobenzoyl)-l-glutamic acid*

Eighteen and one-half grams of p-nitrobenzoyl chloride was added over a period of 0.5 hour to a solution prepared by dissolving 18.5 grams of l(+)-glutamic acid hydrochloride in a suspension of 4.2 grams of sodium bicarbonate in 200 milliliters of water. After stirring at 40° to 45° C. for two hours, the solution was filtered, acidified and extracted with ether. The ether was evaporated and the residue crystallized from water. There was thus obtained 19.6 grams of N'-(p-nitrobenzoyl)-l-glutamic acid melting at 110° to 114° C. and having a specific rotation $(\alpha)_D^{25} = -9.0°$ in 95 per cent ethanol. Esterification of the acid with ethanol and hydrogen chloride gives the diethyl ester of Example 1.

*Example 4. — N' - (p-aminobenzoyl)-l-glutamic acid*

N'-(p-nitrobenzoyl)-l-glutamic acid was dissolved in ethanol and reduced with hydrogen under a pressure of 40 pounds per square inch using platinum oxide as a catalyst. The reduced solution was filtered to recover platinum and evaporated to dryness. The residue consisted of a 70 per cent yield of crude N'-(p-aminobenzoyl)-l-glutamic acid melting at 156° to 163° C.

*Example 5.—N-((2-amino-4-hydroxy-6-pteridyl)methyl)-p-aminobenzoic acid*

A solution of 90 milligrams of dichloroacetone in 0.6 milliliter of glacial acetic acid was added drop-wise over a period of 30 minutes to a hot, stirred solution of 100 milligrams of 2,4,5-triamino-6-hydroxypyrimidine, 100 milligrams of p-aminobenzoic acid and 50 milligrams of potassium iodine in 15 milliliters of normal sodium acetate-acetic acid buffer solution having a pH of 4.2. The mixture was heated for forty-five minutes on the steam bath after the dichloroacetone had been added and then cooled, centrifuged and the solid washed three times with water and once with absolute alcohol. The product after drying weighed 65 milligrams and consisted of N-(2-amino-4-hydroxy-6-pteridyl)methyl)-p-aminobenzoic acid which stimulated the growth of S. fecalis R.

*Example 6.—N-((2-amino-4-hydroxy-6-pteridyl)methyl)-p-aminobenzoic acid*

A solution of 100 milligrams of 2,4,5-triamino-6-hydroxypyrimidine and 90 milligrams of dichloroacetone in 7 milliliters of dry ethylene glycol was heated on a steam bath for fifteen minutes. Fifty milligrams of potassium iodide and 290 milligrams of p-aminobenzoic acid were then added and heating was continued on the steam bath for two hours. The mixture was then kept at room temperature for 1.5 hours, then heated on the steam bath for an additional hour and finally allowed to stand exposed to the air at room temperature for about seventy-two hours. A large volume of alcohol was then added, the mixture was centrifuged and the solid residue washed three times with water and twice with absolute alcohol. The dry product containing N-((2-amino-4-hydroxy-6-pteridyl)methyl)-p-aminobenzoic acid weighed 65 milligrams and stimulated the growth of S. fecalis R.

*Example 7.—N-((2-amino-4-hydroxy-6-pteridyl)methyl)-p-aminobenzoic acid*

Ninety milligrams of dichloroacetone was added to a mixture consisting of 100 milligrams of 2,4,5-triamino-6-hydroxypyrimidine, 100 milligrams of p-aminobenzoic acid, 250 milligrams of sodium acetate and about 50 milligrams of potassium iodide in 15 milliliters of glacial acetic acid. The solution was kept at room temperature for about one hour and then heated on the steam bath for fifteen minutes during which time it became very dark. The mixture was finally allowed to stand overnight at room temperature. The acetic acid was then volatilized under reduced pressure and about twenty milliliters of water added. The pH of the mixture was 4.0. The mixture was cooled in ice, centrifuged and the residue washed twice with water and once with absolute alcohol. The dry product weighed 70 milligrams, contained N-((2-amino-4-hydroxy-6-pteridyl)methyl)-p-aminobenzoic acid and stimulated the growth of S. fecalis R.

*Example 8.—N-((2-amino-4-hydroxy-6-pteridyl)methyl)-p-aminobenzoic acid*

A mixture was prepared consisting of 100 milligrams of 2,4,5 - triamino - 6-hydroxypyrimidine, 352 milligrams of ethyl p-aminobenzoate, 15 milliliters of glacial acetic acid, 90 milligrams of dichloroacetone and 30 milligrams of potassium iodide. The mixture was allowed to stand at room temperature for one hour and was then heated on the steam bath for fifteen minutes. It was then allowed to stand overnight exposed to the air at room temperature. Acetic acid was then removed from the mixture under reduced pressure and 20 milliliters of water was added to the solid residue. The pH of the mixture was adjusted to 3.2 and the mixture cooled and filtered. The solid residue of ethyl N-((2-amino-4 - hydroxy-6-pteridyl)methyl)-p-aminobenzoate was then treated under an atmosphere of nitrogen with fifty milliliters of 0.1 normal sodium hydroxide which had been boiled and cooled under nitrogen. The saponification was allowed to continue at room temperature for 4.75 hours and the pH of the mixture was then adjusted to 3.4 with acetic acid. The acidified mixture was cooled in an ice bath and centrifuged and the solid was washed three times with water and twice with absolute ethanol. The product thus obtained, contained N-((2-amino-4-hydroxy-6-pteridyl)methyl)-p-aminobenzoic acid, weighed 50 milligrams and, upon assay against S. fecalis R. by the method of Teply and Elvehjem (J. Biol. Chem., 157, 3033 (1945), had an activity of 277,000 gamma per gram.

*Example 9.—N' - (N - ((2-amino-4-hydroxy-6-pteridyl)methyl) - p-aminobenzoyl) - glutamic acid*

Ninety milligrams of dichloroacetone was added to a mixture of 100 milligrams of 2,4,5-triamino-6-hydroxypyrimidine, 229 milligrams of diethyl N'-(p-aminobenzoyl)-glutamate, 240 milligrams of sodium acetate, 30 milligrams of potassium iodine and 15 milliliters of glacial acetic acid. The solution was allowed to stand at room temperature for seventy minutes then heated on the steam bath for fifteen minutes and finally allowed to stand overnight exposed to the air at room temperature. The acetic acid was volatilized under reduced pressure, 20 milliliters of water was added to the residue and the pH of the resulting mixture was adjusted to 3.8. The mixture was then centrifuged, the recovered solid diethyl N'-(N-((2-amino-4-hydroxy-6-pteridyl)-methyl)-p-aminobenzoyl)-glutamate was mixed with 10 milliliters of water and the pH of the mixture was adjusted to 7.0 with sodium hydroxide solution. An additional 27 milliliters of 0.1 normal sodium hydroxide solution was then added to the cold solution and the mixture allowed to stand at room temperature for four and one-half hours to hydrolyze the ethyl ester groups. The pH was then adjusted to 3.5 with acetic acid and the mixture cooled in ice and centrifuged. The solid was washed three times with water and once with absolute alcohol. The dry product consisting of N'-(N-((2-amino-4-hydroxy - 6 - pteridyl) methyl) - p-aminobenzoyl)-glutamic acid had an activity against *L. casei* equal to 3.4 percent of that of pure folic acid.

*Example 10.—N'-(N-((2 - amino - 4 - hydroxy - 6-pteridyl) methyl) - p - aminobenzoyl)-glutamic acid*

A solution of 76 milligrams of 1-chloro-3-hydroxypropanone-2-in 15 milliliters of glacial acetic acid was added in an atmosphere of nitrogen to a mixture of 99 milligrams of 2,4,5-triamino-6-hydroxypyrimidine, 451 milligrams of diethyl N'-(p-aminobenzoyl)-glutamate and 40 milligrams of potassium iodide. A rapid change in color of the mixture to deep orange-red occurred almost immediately. The mixture was stirred for seventy minutes under nitrogen at room temperature at the end of which time the color had changed to reddish-brown. The mixture was then heated for ten minutes on the steam bath, the color becoming entirely brown. The mixture was then concentrated in vacuo, twenty milliliters of water was added and the pH of the mixture adjusted to 3.0. The solid which separated was removed by centrifuging and mixed with ten milliliters of normal sodium hydroxide solution. The mixture was allowed to stand for about sixteen hours in the refrigerator and then for thirty minutes at room temperature to hydrolyze the ethyl ester groups. The mixture was homogeneous at this point. The pH of the mixture was then adjusted to 3.0 with dilute hydrochloric acid and after cooling the mixture for two hours, it was centrifuged and the recovered solid product washed twice with water and once with acetone. The crude N'-(N-((2-amino - 4 - hydroxy - 6 - pteridyl) methyl)-p-aminobenzoyl)-glutamic acid thus obtained weighed 70 milligrams after drying over phosphorus pentoxide and had an activity against *L. casei* equal to 4 per cent of that of pure folic acid.

*Example 11.—N-((2 - amino - 4 - hydroxy-6-pteridyl) methyl) -p-aminobenzoic acid*

A mixture of 100 milligrams of 2,4,5-triamino-6-hydroxy pyrimidine, 90 milligrams of dichloroacetone and 15 milliliters of glacial acetic acid was allowed to stand for 70 minutes at room temperature. Forty milligrams of potassium iodide and 290 milligrams of p-aminobenzoic acid were then added. The mixture was allowed to stand at room temperature for an additional hour and then heated on a steam bath for 15 minutes and finally allowed to stand overnight at room temperature. The acetic acid was then distilled in vacuo, the residue mixed with 15 milliliters of water and the pH of the mixture adjusted to 3.05. The mixture was cooled and centrifuged and the precipitate washed with alcohol and dried. The crude N-((2-amino-4-hydroxy-6-pteridyl) methyl)-p-aminobenzoic acid thus obtained weighed 100 milligrams and had an activity against *L. casei* equal to 9.7 per cent that of pure pteroic acid.

*Example 12.—N-((2 - amino-4 - hydroxy- 6 -pteridyl) methyl) -p-aminobenzoic acid*

A mixture of 90 milligrams of dichloroacetone, 100 milligrams of p-aminobenzoic acid, 40 milligrams of potassium iodide, 60 milligrams of sodium acetate and 15 milliliters of glacial acetic acid was allowed to stand for 4 hours at room temperature and then heated for fifteen minutes on a steam bath. The mixture turned dark brown during the heating. The mixture was then cooled and 120 milligrams of sodium acetate and 100 milligrams of 2,4,5-triamino-6-hydroxy pyrimidine were added. The mixture was again allowed to stand for 80 minutes at room temperature, heated on a steam bath for fifteen minutes and then allowed to stand for about sixteen hours at room temperature. The acetic acid was distilled in vacuo and the residue stirred thoroughly with 15 milliliters of water. The pH of the mixture was adjusted to 3.0 and the mixture then centrifuged. The crystals thus obtained were washed with water and alcohol and dried. There was thus obtained 95 milligrams of crude N-((2-amino-4-hydroxy- 6 -pteridyl) methyl)-p-aminobenzoic acid having an activity against *L. casei* equal to 3.6 per cent that of pure pteroic acid.

We claim:

1. The method for preparing an N-((2-amino-4-hydroxy-6-pteridyl) methyl) - p-aminobenzoate compound having the formula

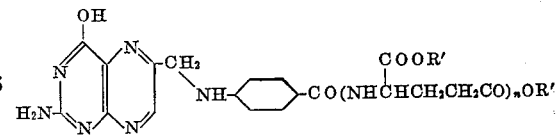

wherein R' is from the group consisting of hydrogen and the alkyl radicals and *n* is from the group consisting of zero and the integer 1, which includes the step of heating a mixture comprising 2,4,5-triamino-6-hydroxypyrimidine, a haloketone having the formula

wherein X is a halogen from the group consisting of chlorine, bromine and iodine and R is from the group consisting of chlorine, bromine, iodine and the hydroxyl radical, and a p-aminobenzoate compound having the formula

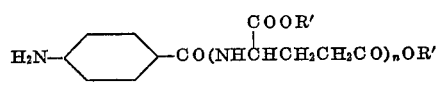

and separating an N-((2-amino-4-hydroxy-6-pteridyl) methyl) - p - aminobenzoate compound from the reaction mixture.

2. The method of claim 1 wherein the haloketone is dichloroacetone.

3. The method of claim 1 wherein *n* is the integer 1.

4. The method of claim 1 wherein R' is an alkyl radical.

5. The method of claim 1 wherein the reaction mixture includes a liquid diluent.

6. The method which includes: heating in a liquid medium a mixture comprising 2,4,5-triamino-6-hydroxypyrimidine, a haloketone having the formula

wherein X is from the group consisting of chlorine, bromine and iodine and R is from the group consisting of chlorine, bromine, iodine and the hydroxyl radical, a p-aminobenzoate compound having the formula

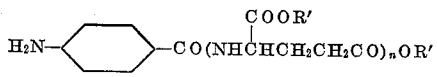

wherein R' is from the group consisting of hydrogen and the alkyl radicals and $n$ is from the group consisting of zero and the integer 1, and a catalytic amount of potassium iodide; and separating from the reaction mixture a compound having the formula

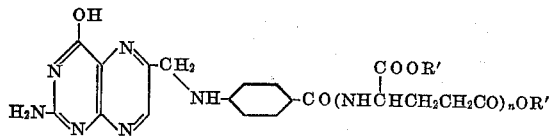

wherein R' and $n$ have the values given.

7. The method of claim 6 wherein the liquid medium is an aqueous solution of acetic acid and sodium acetate.

8. The method which includes: mixing in a liquid medium a haloketone having the formula $$XCH_2COCH_2R$$

wherein X is from the group consisting of chlorine, bromine and iodine and R is from the group consisting of chlorine, bromine, iodine and the hydroxyl radical and a p-aminobenzoate compound having the formula

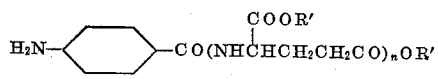

wherein R' is from the group consisting of hydrogen and the alkyl radicals and $n$ is from the group consisting of zero and the integer 1; subsequently adding 2,4,5-triamino-6-hydroxypyrimidine to the mixture; and separating from the reaction mixture a compound having the formula

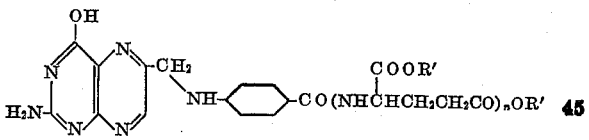

wherein R' and $n$ have the values given.

9. The method which includes: mixing in a liquid medium 2,4,5-triamino-6-hydroxypyrimidine and a haloketone having the formula $$XCH_2COCH_2R$$

wherein X is from the group consisting of chlorine, bromine and iodine and R is from the group consisting of chlorine, bromine, iodine and the hydroxyl radical; subsequently adding to the mixture a p-aminobenzoate compound having the formula

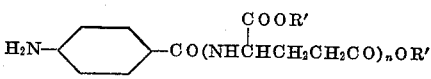

wherein R' is from the group consisting of hydrogen and the alkyl radicals and $n$ is from the group consisting of zero and the integer 1; and separating from the reaction mixture a compound having the formula

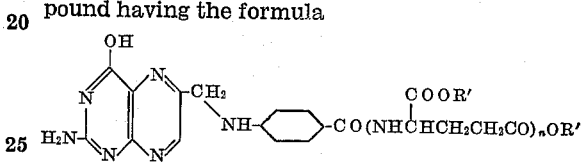

wherein R' and $n$ have the values given.

DAVID I. WEISBLAT.
ARTHUR R. HANZE.

REFERENCES CITED

The following references are of record in the file of this patent:

UNITED STATES PATENTS

| Number | Name | Date |
|---|---|---|
| 2,443,165 | Hultquist et al. | June 8, 1948 |

OTHER REFERENCES

Lederle Bulletin, 13 (No. 3), 21 (1948).